(12) United States Patent
Matzdorf et al.

(10) Patent No.: US 6,669,764 B1
(45) Date of Patent: Dec. 30, 2003

(54) PRETREATMENT FOR ALUMINUM AND ALUMINUM ALLOYS

(75) Inventors: Craig A. Matzdorf, California, MD (US); William C. Nickerson, Jr., Hughesville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/351,752

(22) Filed: Jan. 23, 2003

Related U.S. Application Data

(63) Continuation-in-part of application No. 10/116,844, filed on Apr. 5, 2002, now Pat. No. 6,521,029, which is a continuation-in-part of application No. 09/702,225, filed on Oct. 31, 2000, now Pat. No. 6,375,726.

(51) Int. Cl.[7] .............................................. C23C 22/05
(52) U.S. Cl. ............................... 106/14.44; 106/14.21; 106/14.41; 148/247; 148/267; 148/275; 428/472; 428/472.1
(58) Field of Search ........................... 106/14.21, 14.41, 106/14.44; 148/247, 267, 275; 428/472, 472.1

(56) References Cited

U.S. PATENT DOCUMENTS

| | | | | | |
|---|---|---|---|---|---|
| 3,539,403 A | * | 11/1970 | Ries | ............................ | 148/273 |
| 3,912,548 A | * | 10/1975 | Faigen | ........................ | 428/472 |
| 3,986,970 A | * | 10/1976 | Shiga | ......................... | 252/79.3 |
| 4,148,670 A | * | 4/1979 | Kelly | .......................... | 148/247 |
| 4,273,592 A | * | 6/1981 | Kelly | ....................... | 428/472.2 |
| 4,339,310 A | * | 7/1982 | Oda et al. | .................... | 205/199 |
| 4,921,552 A | * | 5/1990 | Sander et al. | ............... | 148/247 |
| 4,963,198 A | * | 10/1990 | Higgins | ...................... | 148/267 |
| 5,091,023 A | * | 2/1992 | Saeki et al. | .................. | 148/247 |
| 5,226,976 A | * | 7/1993 | Carlson et al. | ............. | 148/257 |
| 5,304,257 A | * | 4/1994 | Pearlstein et al. | ........... | 148/265 |
| 5,395,655 A | * | 3/1995 | Oyama Kazuyuki et al. | ....................... | 427/388.4 |
| 6,375,726 B1 | * | 4/2002 | Matzdorf et al. | ......... | 106/14.44 |
| 6,511,532 B2 | * | 1/2003 | Matzdorf et al. | ......... | 106/14.44 |
| 6,521,029 B1 | * | 2/2003 | Matzdorf et al. | ......... | 106/14.44 |
| 6,527,841 B2 | * | 3/2003 | Matzdorf et al. | ......... | 106/14.44 |

\* cited by examiner

Primary Examiner—Anthony J. Green
(74) Attorney, Agent, or Firm—Ron Billi

(57) ABSTRACT

Pretreated aluminum and aluminum alloys and the process and composition for pretreating said aluminum and its alloys to provide a coating with color recognition for identification purposes and to improved the corrosion-resistance, electrical conductivity, and adhesion properties which comprises pretreating said aluminum and its alloys with an effective amount of an acidic aqueous solution having a pH ranging from about 2.5 to 5.5 comprising water soluble trivalent chromium compounds, alkali metal hexafluorozirconates, divalent zinc compounds, alkali metal fluoro-compounds, and effective amounts of water soluble thickeners, surfactants or wetting agents.

25 Claims, No Drawings

PRETREATMENT FOR ALUMINUM AND ALUMINUM ALLOYS

CONTINUATION APPLICATION

This application is a continuation-in-part of application Ser. No. 10/116,844 filed Apr. 5, 2002, now U.S. Pat. No. 6,521,029B1, issued Feb. 18, 2003, which in turn is a continuation-in-part of application Ser. No. 09/702,225 filed Oct. 31, 2000 by Matzdorf et al., now U.S. Pat. No. 6,375,726B1 issued Apr. 23, 2002.

ORIGIN OF THE INVENTION

This invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to the protection and pretreatment of aluminum and aluminum alloys and to the surface treatment of aluminum and its alloys with novel compositions and to the process of using these compositions for the pretreatment of aluminum and aluminum alloys at ambient and higher temperatures. The pretreatment coatings provide color recognition, improved corrosion resistance, adhesion of overlaying coatings e.g. paints and maintains low electrical contact resistance in a corrosive environment. More specifically, this invention relates to corrosion resistant compositions and to the process of using the compositions on aluminum and aluminum alloys which comprises an acidic aqueous solution containing effective amounts of at least one water soluble trivalent chromium salt, an alkali metal hexafluorozirconate, at least one fluoro-compound, at least one zinc compound and at least one water soluble thickener.

2. Description of Prior Art

It is current practice to improve the corrosion resistance and bonding of subsequent coatings to aluminum and its alloys by initially coating or pretreating the metal surface with protective films. The conversion coating enhances the corrosion resistance of the untreated metal surface and prepares the surface for a finish coating including paints and the like. These conversion or pretreatment coatings are most often applied by using hexavalent chromium-containing solutions. While these coatings provide good corrosion resistance, attempts have been made to provide a more acceptable non-chromate derived coating because of concern regarding the occupational, safety, health and environmental effects of hexavalent chromium. Hexavalent chromium is highly toxic and is a known carcinogen. Therefore, the solutions used to deposit these protective films, and the films per se are toxic and carcinogenic. Chromate films, however, provide outstanding adhesion and corrosion resistance and are easy to apply by various methods including immersion, spraying or by the wipe-on technique. Moreover, the environmental laws and OSH regulations are forcing the military and commercial users to find other non-toxic, non-chromate pretreatments. In addition, the use of chromate conversion coatings is becoming more expensive as the regulations are being enforced and costs become prohibitive because of the restrictions being imposed by the EPA. For example, certain processes such as spraying chromate conversion coatings are forbidden because of OSH regulations, thereby forcing the use of less than optimum alternative methods.

It is generally known that aqueous chromate solutions contain chemicals that partially dissolve the surface of the metal e.g. aluminum and form insoluble films known as a pretreatment or a chromate conversion coating. These coatings are corrosion resistant and protect the metal from various elements which cause corrosion. Although these conversion coatings enhance corrosion resistance and improve the bonding or adhesion properties, the coatings have serious drawbacks, i.e., the toxic nature of the solutions from which they are made and the presence of hexavalent chromium in the applied films. This is a serious problem for the operators handling the solution e.g. disposing the used chromate solution, the chromate-contaminated rinse water, and the coating systems contaminated with chromates. These problems, however, can be avoided by eliminating hexavalent chromium from the process. However, this method is expensive and can be a major cost factor in the overall metal treating process. Therefore, it is highly desirable to provide processes and protective coatings which are free of hexavalent chromium, but at the same time capable of imparting corrosion resistant and bonding properties which are comparable to those imparted by conventional chromate-based conversion coatings. Of particular interest is the use of chromate conversion coatings for aluminum and its alloys e.g. the coating of large objects such as aircraft. Therefore, it would be desirable to provide a protective coating for aluminum and its alloys utilizing relatively non-toxic chemicals that serve as an alternative to the toxic hexavalent chromium coatings.

SUMMARY OF THE INVENTION

This invention relates to an acidic aqueous trivalent chromium pretreatment (TCP) of aluminum and aluminum alloys and to the process for providing color recognition, and identification of the coating and to improve the adhesion and corrosion resistant properties of the aluminum surfaces. Specifically, this invention relates to pretreating aluminum and to the composition and process of pretreating aluminum and aluminum alloys at ambient or higher temperatures ranging up to about 200° F. The pretreatment solutions comprise an acidic aqueous solution having a pH ranging from about 2.5 to 5.5 and preferably from 3.7 to 4.0, and contain per liter of said solution, from about 0.01 to 22 grams of a water-soluble trivalent chromium compound, about 0.01 to 12 grams of an alkali metal hexafluorozirconate, about 0.0 to 12 grams and preferably 0.01 to 1.2 e.g. 0.12 to 0.24 grams of at least one fluoro-compound selected from the group consisting of an alkali metal tetrafluoroborate, an alkali metal hexafluorosilicate and various combinations or mixtures thereof, from about 0.001 to 10 grams of at least one zinc compound, from about 0.0 to 10 grams per liter and preferably 0.5 to 1.5 grams of at least one water-soluble thickener, and from 0.0 to 10 grams per liter and preferably 0.5 to 1.5 grams of at least one water-soluble non-ionic, cationic or anionic surfactant.

One shortcoming of the compositions and processes described by the prior TCP coatings is the lack of a significant color change or color recognition in the as deposited coating, especially when used as a pretreatment for aluminum alloys. Chromate-based coatings typically have an iridescent gold to brown color that is easily identified by processors, quality control personnel, and other users in the field. A gold color on aluminum components generally means that a chromate pretreatment is present and the color is useful for this type of quality control irrespective of technical coating performance such as resistance to corrosion or paint adhesion. The TCP coatings described heretofore typically have a light bluish to purplish to tan color, depending on the process conditions, that is very difficult to see in mixed light such as inside a production facility, in a repair depot or manufacturing plant. TCP on some surfaces like clad aluminum alloys is virtually colorless. Therefore, to provide a means of color identification or recognition of the coating, this invention relates to compositions and processes for preparing a corrosion-resistant coating for aluminum and aluminum alloys. The compositions comprise treating the aluminum substrates with an acidic aqueous solution containing trivalent chromium sulfate basic, an alkali metal hexafluorozirconate, and optionally a cellulose-based thickener and an alkali metal tetrafluoroborate and/or an alkali metal hexafluorosilicate stabilizer. In addition, the composition must also contain a zinc-based compound e.g. divalent salt to impart color recognition to the as produced coating.

It is therefore an object of this invention to provide pretreated aluminum and its alloys by treating said aluminum with an aqueous solution comprising a trivalent chromium compound, an alkali metal hexafluorozirconate, effective amounts of an alkali metal tetrafluoroborate and/or hexafluorosilicate and at least one zinc compound to improve the electrical resistance, adhesion, and corrosion resistance properties and to provide color recognition for identification of the coated aluminum.

It is another object of this invention to provide a process of pretreating aluminum and aluminum alloys with a stable acidic aqueous solution having a pH ranging from about 2.5 to 5.5 which contains effective amounts of a trivalent chromium salt, hexafluorozirconate and a divalent zinc salt to provide color recognition for identification of the coating.

It is a further object of this invention to provide a stable acidic aqueous solution having good "shelf life" containing trivalent chromium salts, hexafluorozirconates, divalent zinc salts and a pH ranging from about 2.5 to 5.5 for pretreating aluminum and its alloys at ambient temperatures wherein said acidic pretreating solution contains substantially no hexavalent chromium.

These and other objects of the invention will become apparent from a further and more detailed description of the invention.

DETAILED DESCRIPTION OF THE INVENTION

This invention relates to an acidic, aqueous stable solution of trivalent chromium compounds having a pH ranging from about 2.5 to 5.5 and preferably from 3.7 to 4.0 and the use thereof at ambient temperatures or higher for pretreating aluminum and aluminum alloys. The stable aqueous solutions comprise from about 0.01 to 22 grams, per liter of solution, and preferably about 0.01 to 10 grams per liter e.g. 5–7 grams of at least one water soluble trivalent chromium compound, about 0.01 to 12 grams and preferably about 0.01 to 8.0 grams e.g. 6–8 grams per liter of solution of at least one alkali metal hexafluorozirconate, about 0.001 to 10 grams and preferably 0.1 to 5.0 grams per liter of at least one divalent zinc compound, about 0.0 to 12 grams and preferably from about 0.01 to 1.2 grams e.g. 0.12 to 0.24 grams of at least one alkali metal tetrafluoroborate, 0.0 to 12 grams and preferably from 0.01 to 1.2 grams e.g. 0.12 to 0.24 grams of an alkali metal hexafluorosilicate and any combination of said borates and silicates, from about 0.0 to 10 grams per liter of the solution and preferably from about 0.5 to 1.5 grams per liter of at least one water soluble thickener e.g. water soluble organic thickener and 0 to 10 grams of at least one surfactant or wetting agent.

In some pretreatments, the alkali metal tetrafluoroborates and/or hexafluorosilicates can be added to the solution in amounts as low as 0.001 grams per liter up to the solubility limits of the compounds. For example, about 50% weight percent of the fluorosilicate is added based on the weight of the fluorozirconate. In other words, for 8 grams per liter of the fluorozirconate salt, about 4.0 grams per liter of fluorosilicate is added to the solution. An alternative is to add about 0.01 to 100 weight percent of the fluoroborate salt based on the weight of the fluorozirconate salt. Preferably, about 1 to 10 weight percent e.g. 3% of the fluoroborate salt can be added based on the weight of the fluorozirconate salt. A specific example comprises about 8 grams per liter of potassium hexafluorozirconate, about 6 grams per liter of chromium III sulfate basic, about 0.1 to 5.0 grams per liter of divalent zinc sulfate and about 0.12 to 0.24 grams per liter of potassium tetrafluoroborate. An important result of the addition of the stabilizing additives i.e. fluoroborates and/or fluorosilicates is that the solution is stable and the pH is maintained between about 2.5 and 5.5. However, in some cases the pretreatment solutions may require small adjustments to the pH by the addition of effective amounts of a dilute acid or base to maintain the pH in the range of about 2.5 to 5.5.

The trivalent chromium may be added to the solution as any water-soluble trivalent chromium compound, preferably as a trivalent chromium salt. Specifically, in formulating the aqueous coatings of this invention, the chromium salt is added conveniently to the solution in its water soluble form wherein the valence of the chromium is plus 3. Some preferred chromium compounds are incorporated in the aqueous solution in the form of $Cr_2(SO_4)_3$, $(NH4)Cr(SO_4)_2$, $Cr(OH)SO_4$, $Cr_2O_3$, or $KCr(SO_4)_2$ and various combinations of these compounds. A preferred trivalent chromium concentration is within the range of about 0.01 to 10 grams per liter of the aqueous solution and it has been found that particularly good results are obtained economically when the chromium is present in this preferred range. A preferred alkali metal fluorozirconate addition to the solution ranges from about 0.01 to 8.0 grams per liter.

The amount of zinc salt can be varied to adjust the color imparted to the coating, from as little as 0.001 grams per liter up to 10 grams per liter. $Zinc^{2+}$ cation or divalent zinc can be supplied by any chemical compound that dissolves in water and is compatible with the other components in the composition. Some compounds that are particularly preferred include zinc acetate, zinc telluride, zinc tetrafluoroborate, zinc molybdate, zinc hexafluorosilicate, zinc sulfate and any combination thereof in any ratio.

The pretreatment of aluminum and its alloys can be carried out at various temperatures including the temperature of the pretreatment solution which ranges from ambient e.g. from about room temperature up to about 200° F. Room temperature treatment is preferred, however, in that this eliminates the necessity for heating equipment. The coating may be air dried- by any of the methods known in the art, for example, oven drying, forced air drying, exposure to infra-red lamps, and the like. For purposes of this invention, the term "aluminum" is intended to include substantially pure aluminum, and any aluminum alloy containing various other metals and particularly any aluminum alloy containing over 60% by weight aluminum.

The following Examples illustrate the stable pretreatment solutions of this invention and the method of using the solutions in providing color recognition and improved adhesion and corrosion-resistant coatings on aluminum and its alloys.

EXAMPLE 1

TCP5P

A stable acidic aqueous pretreating solution having a pH ranging from about 3.45 to 4.0 for pretreating aluminum and aluminum alloys to form a corrosion-resistant coating thereon which comprises, per liter of solution, about 3.0 grams of trivalent chromium sulfate basic, and about 4.0 grams of potassium hexafluorozirconate.

EXAMPLE 2

TCP5PZ2

A stable acidic aqueous solution having a pH ranging from about 3.45 to 4.0 for pretreating aluminum and aluminum alloys to provide a corrosion-resistant and a color recognized coating thereon which comprises, per liter of solution, about 3.0 grams of trivalent chromium sulfate basic, about 4.0 grams of potassium hexafluorozirconate and about 1.0 gram zinc sulfate.

EXAMPLE 3

TCP5B3

A stable acidic aqueous solution for pretreating aluminum and aluminum alloys to form a corrosion-resistant coating thereon which comprises, per liter of solution, about 3.0 grams of trivalent chromium sulfate basic, about 4.0 grams of potassium hexafluorozirconate, and about 0.12 grams of potassium tetrafluoroborate.

EXAMPLE 4

TCP5B3Z4

A stable acidic aqueous solution for pretreating aluminum and aluminum alloys to provide a corrosion-resistant and a color recognized coating thereon which comprises, per liter of solution, about 3.0 grams of trivalent chromium sulfate basic, about 4.0 grams of potassium hexafluorozirconate, about 0.12 grams of potassium tetrafluoroborate and about 2.0 grams of divalent zinc sulfate.

EXAMPLE 5

TCP5PZA

A stable acidic aqueous solution for pretreating aluminum and aluminum alloys to provide a corrosion-resistant and a color recognized coating thereon which comprises, per liter of solution, about 3.0 grams of trivalent chromium sulfate basic, about 4.0 grams of potassium hexafluorozirconate, and about 5.0 grams of divalent zinc acetate.

EXAMPLE 6

Pretreated aluminums and alloys of aluminum having improved corrosion-resistance and adhesion properties comprising said aluminum and alloys of aluminum treated with an effective amount of an acidic aqueous solution having a pH ranging from about 3.7 to 4.0, and containing per liter of said solution from about 0.01 to 10 grams of a water soluble trivalent chromium salt, about 0.01 to 8 grams of an alkali metal hexafluorozirconate, about 0.01 to 1.2 grams of at least one fluoro-compound selected from the group consisting of an alkali metal tetrafluoroborate, an alkali metal hexafluorosilicate and mixtures thereof, from 0 to 10 grams of at least one water soluble thickener and from 0 to 10 grams of at least one water soluble surfactant.

EXAMPLE 7

An acidic aqueous solution having a pH ranging from about 2–6 for preparing corrosion-resistant coatings on aluminum, and aluminum alloys consisting essentially of, per liter of solution, from about 3.0 grams to 22 grams of a water soluble trivalent chromium salt, about 1.5 grams to 11.5 grams of an alkali metal hexafluorozirconate, from 0 to 10 grams of at least one water soluble thickener and from 0 to 10 grams of at least one water soluble surfactant.

Prior to forming the trivalent chromium pretreatment, the aluminum substrates were treated by cleaning the aluminum for about 15 minutes at temperatures ranging from about 100° to 140° F. with an alkaline phosphate cleaner Turco 4215 NC-LT, rinsed in tap water and subsequently immersed in a non-chromate deoxidizer (Turco Smut Go NC) for about 1 to 15 minutes under ambient conditions, and then rinsed again in ambient tap water. The cleaned substrates were then immersed in an acidic trivalent chromium sulfate solution at ambient conditions for about 30 seconds to 60 minutes and subsequently rinsed in ambient tap water and let stand until dry. In an alternative process, the aluminum substrates were sprayed with an alkaline phosphate cleaner for about 15 minutes at elevated temperatures, then rinsed in cold tap water and sprayed with (Turco Smut Go NC) for about 30 seconds under ambient conditions.

Coating the aluminum substrates with the trivalent chromium solutions of this invention can be accomplished by spraying, wiping or immersing the aluminum panels. The duration of contact ranges from about 30 seconds to about 5 minutes, but longer contact, e.g., up to sixty minutes or more, may be required where the trivalent chromium concentration or temperature of the solution is relatively low. The aqueous solution temperature is normally below 100° C., e.g. in the range of 15° to 75° C. e.g. about 25° C. The aluminum temperatures ranges from about 15° to 30° C.

TABLE A-1, A-2 AND A-3

Colorimetry Results (All readings taken on Hunterlabs D25PC2 Colorimeter)

TABLE A-1

| Aluminum alloy 2024-T3 | | | |
|---|---|---|---|
| Pretreatment | L | a | b |
| TCP5P | 42.7 | −0.3 | −7.1 |
| TCP5P EX. 1 | 42.6 | −0.4 | −6.7 |
| TCP5PZ2 | 34.9 | −0.6 | 0.2 |
| TCP5PZ2 EX. 2 | 36.0 | −0.4 | 0.5 |

TABLE A-2

| Aluminum alloy 7075-T6 | | | |
|---|---|---|---|
| Pretreatment | L | a | b |
| TCP5P | 38.4 | 0.1 | −3.7 |
| TCP5P | 37.0 | −0.2 | −3.6 |
| TCP5PZ2 | 34.3 | −0.4 | −0.1 |
| TCP5PZ2 | 33.8 | −0.9 | 0.2 |

TABLE A-3

Aluminum alloy 2219-T87

| Pretreatment | L | a | b |
|---|---|---|---|
| TCP5P | 52.1 | −2.2 | −4.9 |
| TCP5P | 51.2 | −1.0 | −4.1 |
| TCP5PZ2 | 41.4 | −0.8 | 0.6 |
| TCP5PZ2 | 43.6 | −0.7 | 4.2 |

In Tables A-1, A-2, and A-3, L is the grayscale, wherein L=100 is pure white, L=0 is pure black, and L=50 is gray. Where "a" is the red to green scale, and wherein 0 is a neutral value, +50 is pure red, and −50 is pure green. Where "b" is the yellow to blue scale, and wherein 0 is a neutral value, +50 is pure yellow, and −50 is pure blue. Combining the "a" and "b" values gives the desired color (for example: where −"b", +"a" is purplish, "b" =−50 and "a" =+50 is pure purple) and the L value shows the darkness of the panels.

TABLE B

Representative Compositions and Processes to Produce Color Change and Recognition of the Coating

| Name | Composition | Process | Comments | Documentation Comparison |
|---|---|---|---|---|
| TCP5P | 3 grams/liter chromium III sulfate basic and 4 grams/liter potassium hexafluorozirconate EX 1 | 2 to 5 minute dwell of composition on aluminum surface at ambient conditions | Baseline composition and process that yields coating without practical color change | Example 7 |
| TCP5B3 | TCP5P and 0.12 grams/liter potassium tetrafluoroborate EX 3 | 2 to 5 minute dwell of composition on aluminum surface at ambient conditions | Stabilized composition and process that yields coating without practical color change | Example 6 |
| TCP5PZ2 | TCP5P and 1.0 grams/liter zinc sulfate EX 2 | 1 to 10 minute dwell of composition on aluminum surface at ambient conditions | Baseline composition and process that yields coating with practical color change | Invention |
| TCP5B3Z4 | TCP5B3 and 2.0 grams/liter zinc sulfate EX 4 | 1 to 10 minute dwell of composition on aluminum surface at ambient conditions | Stabilized composition and process that yields coating without practical color change | Invention |
| TCP5PZA | TCP5P and 5.0 grams/liter zinc acetate EX 5 | 1 to 10 minute dwell of composition on aluminum surface at ambient conditions | Buffered baseline composition and process that yields coating with practical color change | Invention |

The term "practical color change" means a readily visible recognizable color that does not have a detrimental effect on the corrosion performance of the coating. The term "chromium III sulfate basic" is defined in the Kirk-Othmer Encyclopedia of Chemical Knowledge: Volume 6, $3_{rd}$ edition (pps 95–96).

The advantage of the composition and process is the readily visible color change and recognition imparted to the as-deposited coating compared to previously disclosed trivalent chromium-based aluminum pretreatments. Tables A-1, A-2 and A-3 detail colormetric measurements of various aluminum alloys coated with the TCP solutions described by this invention compared to those previously disclosed without the zinc compound. Table B describes representative compositions and the processes used to deposit the pretreatment coatings of this invention in comparison to prior TCP coatings without a zinc salt.

Where large surfaces of aluminum do not permit immersion or where vertical surfaces are to be sprayed, thickening agents can be used to retain the aqueous solutions on the surface for sufficient contact time. The thickeners employed are known water soluble or dispersible thickeners which can be added to the trivalent chromium solutions of this invention in amounts ranging from about 0.0 to about 10 grams per liter and preferably from about 0.5 to 1.5 grams per liter of the solution. Specific examples of these additives include the preferred cellulose thickeners e.g. hydroxypropyl cellulose (e.g. Klucel), ethyl cellulose, hydroxyethyl cellulose, hydroxymethyl cellulose, methyl cellulose, and some of the other known water soluble thickeners such as colloidal silica, clays such as bentonite, starches, colloidal alumina, gum arabic, tragacanth, agar and any combination thereof.

For purposes of this invention, the water soluble surfactants are used in amounts ranging from about 0.0 to about 10 grams per liter and preferably about 0.5 to 1.5 grams per liter of the TCP solution. The surfactants are added to the aqueous solutions to provide better wetting properties by lowering the surface tension thereby insuring complete coverage, and a more uniform coating on the substrate. The surfactants include at least one water soluble compound selected from the group consisting of the non-ionic, anionic and cationic surfactants. Specific water soluble surfactants include the monocarboxyl imidoazoline, alkyl sulfate sodium salts (DUPONOL®), tridecyloxy poly(alkyleneoxy ethanol), ethoxylated or propoxylated alkyl phenol (IGEPAL®), alkyl sulfoamides, alkaryl sulfonates, palmitic alkanol amides (CENTROL®), octylphenyl polyethoxy ethanol (TRITON®), sorbitan monopalmitate (SPAN®), dodecylphenyl polyethylene glycol ether (e.g. TERGITROL®), alkyl pyrrolidone, polyalkoxylated fatty acid esters, alkylbenzene sulfonates and mixtures thereof. Other known water soluble surfactants are disclosed by "Surfactants and Detersive Systems", published by John Wiley & Sons in Kirk-Othmer's Encyclopedia of Chemical Technology, $3^{rd}$ Ed.

While this invention has been described by a number of specific examples, it is obvious that there are other variations and modifications which can be made without departing from the spirit and scope of the invention as particularly set forth in the appended claims.

What is claimed is:

1. A process for pretreating aluminum and alloys of aluminum to provide a coating having color recognition, and improved corrosion-resistance, electrical conductivity, and adhesion properties which comprises treating said aluminum and alloys of aluminum with an acidic aqueous solution having a pH ranging from about 2.5 to 5.5 and comprises, per liter of said solution, from about 0.01 to 22 grams of a water soluble trivalent chromium compound, about 0.01 to 12 grams of an alkali metal hexafluorozirconate, about 0.0 to 12 grams of at least one water soluble fluoro-compound selected from the group consisting of alkali metal tetrafluoroborates, alkali metal hexafluorosilicates and mixtures thereof, about 0.001 to 10 grams of at least one water soluble zinc compound, and from 0 to 10 grams of at least one water soluble thickener.

2. The process of claim 1 wherein the pH of the aqueous solution ranges from about 3.7 to 4.0 and the temperature of the aqueous solution ranges from about room temperature to about 200° F.

3. The process of claim 2 wherein the trivalent chromium compound ranges from about 5.0 to 7.0 grams, the hexafluorozirconate ranges from about 6.0 to 8.0 grams, and the tetrafluoroborate ranges from about 0.01 to 1.2 grams.

4. The process of claim 1 wherein the thickener is a cellulose compound ranging from 0.5 to 1.5 grams.

5. The process of claim 1 wherein the alkali metal hexafluorozirconate is potassium hexafluorozirconate.

6. A process for pretreating aluminum and alloys of aluminum to provide a coating having color recognition, and improved corrosion-resistance, electrical conductivity, and adhesion properties which comprises treating said aluminum and alloys of aluminum at about room temperature with an aqueous solution having a pH ranging from about 3.7 to 4.0 and comprises per liter of solution from about 0.01 to 10 grams of a water soluble trivalent chromium salt, about 0.01 to 8.0 grams of an alkali metal hexafluorozirconate, about 0.0 to 12 grams of at least one fluoro-compound selected from the group consisting of alkali metal tetrafluoroborates, alkali metal hexafluorosilicates and mixtures thereof, and about 0.001 to 10 grams of at least one water soluble divalent zinc salt.

7. The process of claim 6 wherein the tetrafluoroborate is present in the solution in an amount ranging from about 0.12 to 0.24 grams.

8. The process of claim 6 wherein about 0.5 to 1.5 grams of a cellulose thickener is added to the solution.

9. The process of claim 6 wherein the chromium salt is trivalent chromium sulfate.

10. The process of claim 6 wherein the zinc SaH is divalent zinc sulfate ranging in an amount from about 0.01 to 5.0 grams per liter.

11. Pretreated aluminum and alloys of aluminum having a color recognized coating and improved corrosion-resistance, electrical conductivity, and adhesion properties comprising said aluminum and alloys of aluminum treated with an acidic aqueous solution having a pH ranging from about 2.5 to 5.5 and comprising per liter of said solution from about 0.01 to 22 grams of a water-soluble trivalent chromium compound, from about 0.01 to 12 grams of an alkali metal hexafluorozirconate, about 0.0 to 12 grams of at least one fluoro-compound selected from the group consisting of an alkali metal tetrafluoroborate, an alkali metal hexafluorosilicate and mixtures thereof, about 0.001 to 10 grams of at least one Water soluble zinc compound and from 0 to 10 grams of at least one water soluble thickener.

12. The pretreated aluminum of claim 11 wherein the thickener ranges from about 0.5 to 1.5 grams.

13. The pretreated aluminum of claim 11 wherein the zinc compound is divalent zinc sulfate and the hexafluorosilicate is present in an amount ranging from about 0.01 to 1.2 grams.

14. The pretreated aluminum of claim 11 wherein the tetrafluoroborate is present in the solution in an amount ranging from about 0.01 to 1.2 grams.

15. The pretreated aluminum of claim 11 wherein about 0.5 to 1.5 grams of a cellulose thickener is present in the solution.

16. The pretreated aluminum of claim 11 wherein the chromium compound is trivalent chromium sulfate.

17. The pretreated aluminum of claim 11 wherein the alkali metal hexafluorozirconate is potassium hexafluorozirconate.

18. Pretreated aluminum and alloys of aluminum having a color recognized coating and improved corrosion-resistance, electrical conductivity, and adhesion properties comprising said aluminum and alloys of aluminum treated with an acidic aqueous solution having a pH ranging from about 3.7 to 4.0, and comprising per liter of said solution from about 0.01 to 10 grams of a water soluble trivalent chromium salt, about 0.01 to 8.0 grams of an alkali metal hexafluorozirconate, about 0.0 to 12 grams of at least one fluoro-compound selected from the group consisting of an alkali metal tetrafluoroborate, an alkali metal hexafluorosilicate and mixtures thereof, 0.001 to 10 grams of at least one water soluble divalent zinc salt and from 0 to 10 grams of at least one water soluble thickener.

19. The pretreated aluminum of claim 18 wherein the zinc salt is divalent zinc sulfate.

20. The pretreated aluminum of claim 18 wherein the zinc salt is divalent zinc acetate.

21. A composition for pretreating aluminum and alloys of aluminum to provide a color recognizable coating and to improved the corrosion-resistance, electrical conductivity and adhesion properties of the coated aluminum which comprises an aqueous solution having a pH ranging from about 2.5 to 5.5 and per liter of solution from about 0.01 to 22 grams of a water soluble trivalent chromium compound, about 0.01 to 12 grams of an alkali metal hexafluorozirconate, about 0.0 to 12 grams of at least one water soluble fluoro-compound selected from the group consisting of alkali metal tetrafluoroborates, alkali metal hexfluorosilicates and mixtures thereof, about 0.001 to 10 grams of at least one water soluble zinc compound and from 0 to 10 grams of at least one water soluble thickener.

22. The composition of claim 21 wherein the pH ranges from about 3.7 to 4.0.

23. The composition of claim 21 wherein the trivalent chromium compound is trivalent chromium sulfate basic.

24. The composition of claim 21 wherein the zinc compound is divalent zinc sulfate.

25. The composition of claim 21 wherein the zinc compound is divalent zinc acetate.

* * * * *